(12) United States Patent
Lindner

(10) Patent No.: US 8,971,970 B2
(45) Date of Patent: *Mar. 3, 2015

(54) SYSTEM AND METHOD FOR DISPLAYING OBJECT LOCATION IN AUGMENTED REALITY

(71) Applicant: BlackBerry Limited, Waterloo (CA)

(72) Inventor: Jeffery Lindner, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,828

(22) Filed: Oct. 8, 2013

(65) Prior Publication Data
US 2014/0028718 A1    Jan. 30, 2014

Related U.S. Application Data

(63) Continuation of application No. 13/618,591, filed on Sep. 14, 2012, now Pat. No. 8,571,579, which is a continuation of application No. 12/901,249, filed on Oct. 8, 2010, now Pat. No. 8,315,674.

(51) Int. Cl.
*H04M 1/00*    (2006.01)
*H04B 1/38*    (2006.01)
(Continued)

(52) U.S. Cl.
CPC ......... *G06T 19/006* (2013.01); *H04M 1/72522* (2013.01); *H04W 4/043* (2013.01);
(Continued)

(58) Field of Classification Search
CPC . G06T 11/00; G06T 19/006; H04M 1/72522; H04M 2250/10; H04M 2250/12; H04M 2250/52; H04W 4/023; H04W 4/025; H04W 4/043; H04W 64/00; G03C 7/3029
See application file for complete search history.

(56) References Cited

U.S. PATENT DOCUMENTS 5,364,093 A * 11/1994 Huston et al. .................. 473/407
7,389,041 B2    6/2008 Gindele et al.
(Continued)

FOREIGN PATENT DOCUMENTS

EP    2098821 A1    9/2009
GB    2465280 A    5/2010
(Continued)

OTHER PUBLICATIONS

Theodolite iPhone App; screenshots taken from http://hunter.pairsite.com/theodolite/; site accessed at least as early as Dec. 17, 2009; retrieved from the internet at least as early as Apr. 15, 2010.
(Continued)

*Primary Examiner* — Quan M Hua
(74) *Attorney, Agent, or Firm* — Brett J. Slaney; Thomas Y.T. Wong; Blake, Cassels & Graydon LLP

(57) ABSTRACT

A system and a method are provided for displaying location information on a mobile device. The location information can include direction, distance, positional coordinates, etc. The mobile device's display displays an image captured using the mobile device's camera. A selection input is received to identify an object in the image. A facing direction of the mobile device is detected using the mobile device's magnetometer. The mobile device determines a bearing to the object relative to the mobile device's facing direction. The mobile device then determines a distance between the mobile device and the object. The obtained or computed location data is overlaid on the image, thereby augmenting the image. The location data can include at least a direction indicator of the object and the distance between the mobile device and the object, whereby the direction indicator can be determined using the bearing.

20 Claims, 11 Drawing Sheets

(51) Int. Cl.
*G06T 19/00* (2011.01)
*H04M 1/725* (2006.01)
*H04W 4/04* (2009.01)
*H04W 64/00* (2009.01)
*G06T 11/00* (2006.01)
*H04W 4/02* (2009.01)

(52) U.S. Cl.
CPC .............. *H04W 64/00* (2013.01); *G06T 11/00* (2013.01); *H04M 2250/10* (2013.01); *H04M 2250/12* (2013.01); *H04M 2250/52* (2013.01); *H04W 4/023* (2013.01); *H04W 4/025* (2013.01)
USPC .......... 455/566; 455/456.1; 701/300; 701/400

(56) References Cited

U.S. PATENT DOCUMENTS

| | | | |
|---|---|---|---|
| 7,634,354 B2 * | 12/2009 | Salmre | ..................... 701/438 |
| 2007/0088497 A1 | 4/2007 | Jung | |
| 2009/0278948 A1 | 11/2009 | Hayashi | |
| 2010/0074609 A1 | 3/2010 | Kasama et al. | |
| 2010/0179005 A1 | 7/2010 | Meadows et al. | |
| 2011/0098924 A1 * | 4/2011 | Balardeta et al. | ............. 701/213 |

FOREIGN PATENT DOCUMENTS

| | | |
|---|---|---|
| JP | 2008-185579 | 8/2008 |
| JP | 2008-209162 | 9/2008 |
| JP | 2008-241609 | 10/2008 |
| WO | WO 2007/090660 A1 | 8/2007 |

OTHER PUBLICATIONS

Augmented Driving; screenshots taken from http://www.imaginyze.com/Site/Welcome.html; site accessed at least as early as Dec. 17, 2009; retrieved from the internet at least as early as Apr. 15, 2010.
Augmented Reality Car Finder Application for iPhone; text and screenshot taken from http://www.jdmag.com/2009/11/07/augmented-reality-car-finder-application-for-iphone/; Nov. 9, 2009; retrieved from the internet at least as early as Apr. 15, 2010.
Azaustre Maleno, V.; Search Report from corresponding European Application No. 10187073.1; search completed Mar. 9, 2011.

* cited by examiner

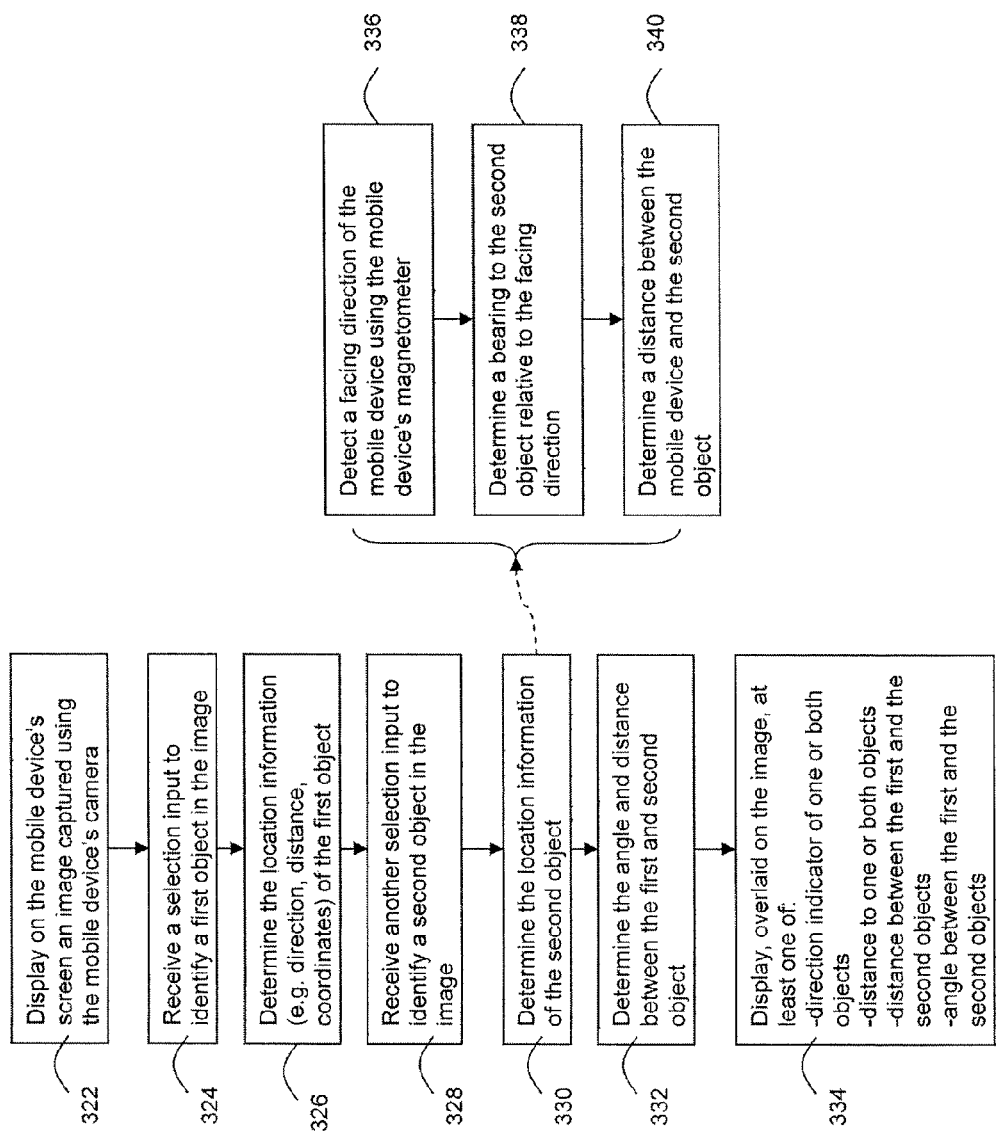

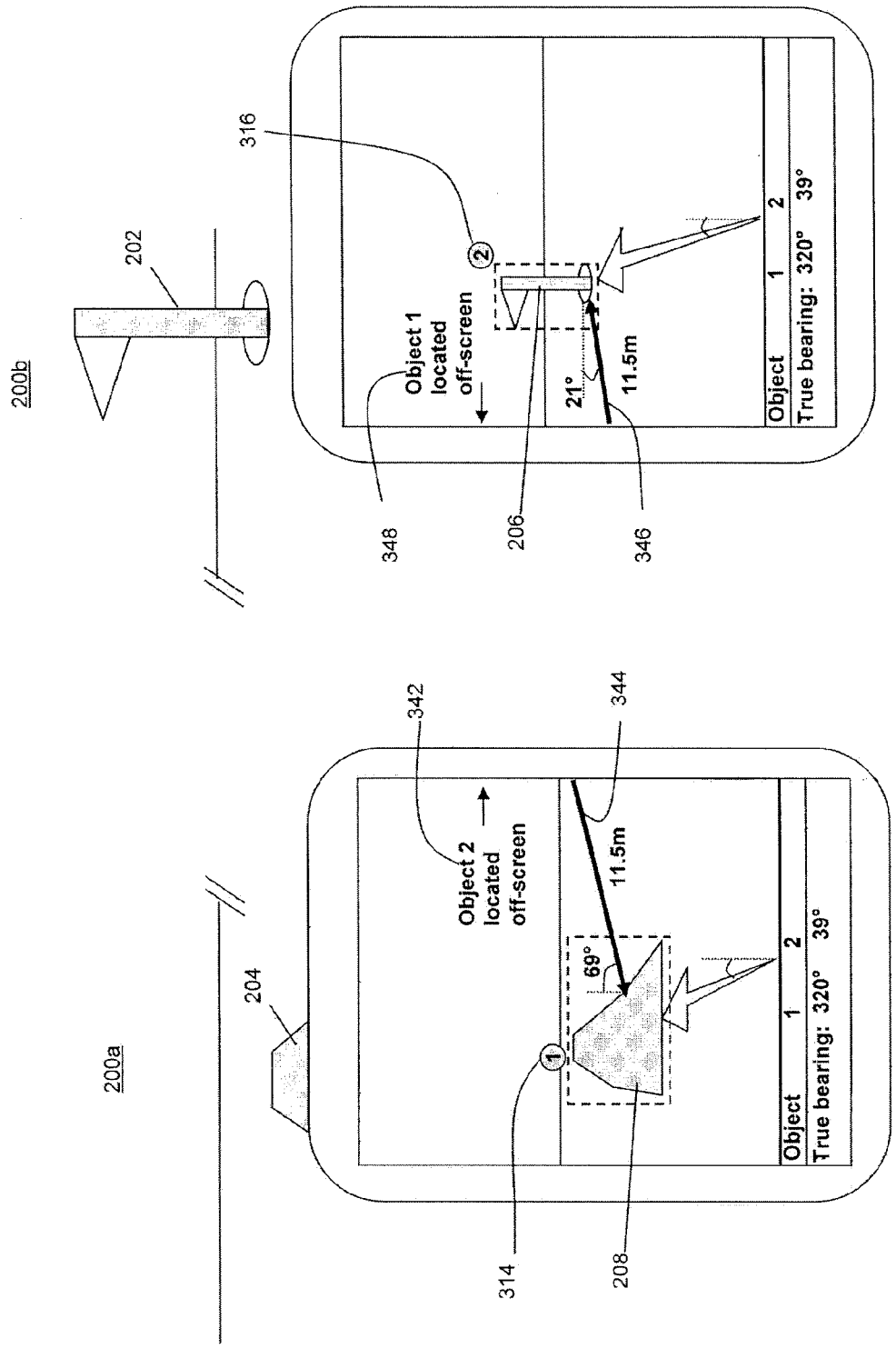

SYSTEM AND METHOD FOR DISPLAYING OBJECT LOCATION IN AUGMENTED REALITY

CROSS-REFERENCE TO RELATED APPLICATIONS

The present application is a continuation of U.S. patent application Ser. No. 13/618,591 filed on Sep. 14, 2012, which is a continuation of U.S. patent application Ser. No. 12/901,249 filed on Oct. 8, 2010 and issued on Nov. 20, 2012 as U.S. Pat. No. 8,315,674, the contents of all of which are incorporated herein by reference.

TECHNICAL FIELD

The following relates generally to displaying location data (e.g. direction, distance, and position coordinates) of an object shown through a display of a mobile device.

DESCRIPTION OF THE RELATED ART

In many mobile devices, information about the environment of the mobile device can be obtained and displayed to a user. For example, the GPS location of the mobile device, and information associated with the mobile device's current location can be displayed on a mobile device display. However, displaying information that is more immediate to the mobile device's surroundings is challenging since it involves obtaining and sensing data that cannot be determined through widely used GPS devices. It is also known to use photos captured by the mobile device's camera to gather information about the immediate surroundings. The photos, however, may not reflect the view currently seen by the camera. Consequently, methods for displaying data about the mobile device's surroundings are typically delayed and appear to be limited in their interaction with the actual surroundings.

BRIEF DESCRIPTION OF THE DRAWINGS

Embodiments will now be described by way of example only with reference to the appended drawings wherein:

FIG. 14 is a flow diagram of example computer executable instructions for calculating the distance and angle between at least two objects.

FIG. 15 is a schematic diagram illustrating the augmentation of an image displayed on the mobile device, whereby a first object is displayed in a first image, with location information of a second object that is not shown in the first image.

FIG. 16 is another schematic diagram similar to FIG. 15, whereby the second object is displayed in a second image, with location information of the first object that is not shown in the second image.

DETAILED DESCRIPTION

Figure 1:
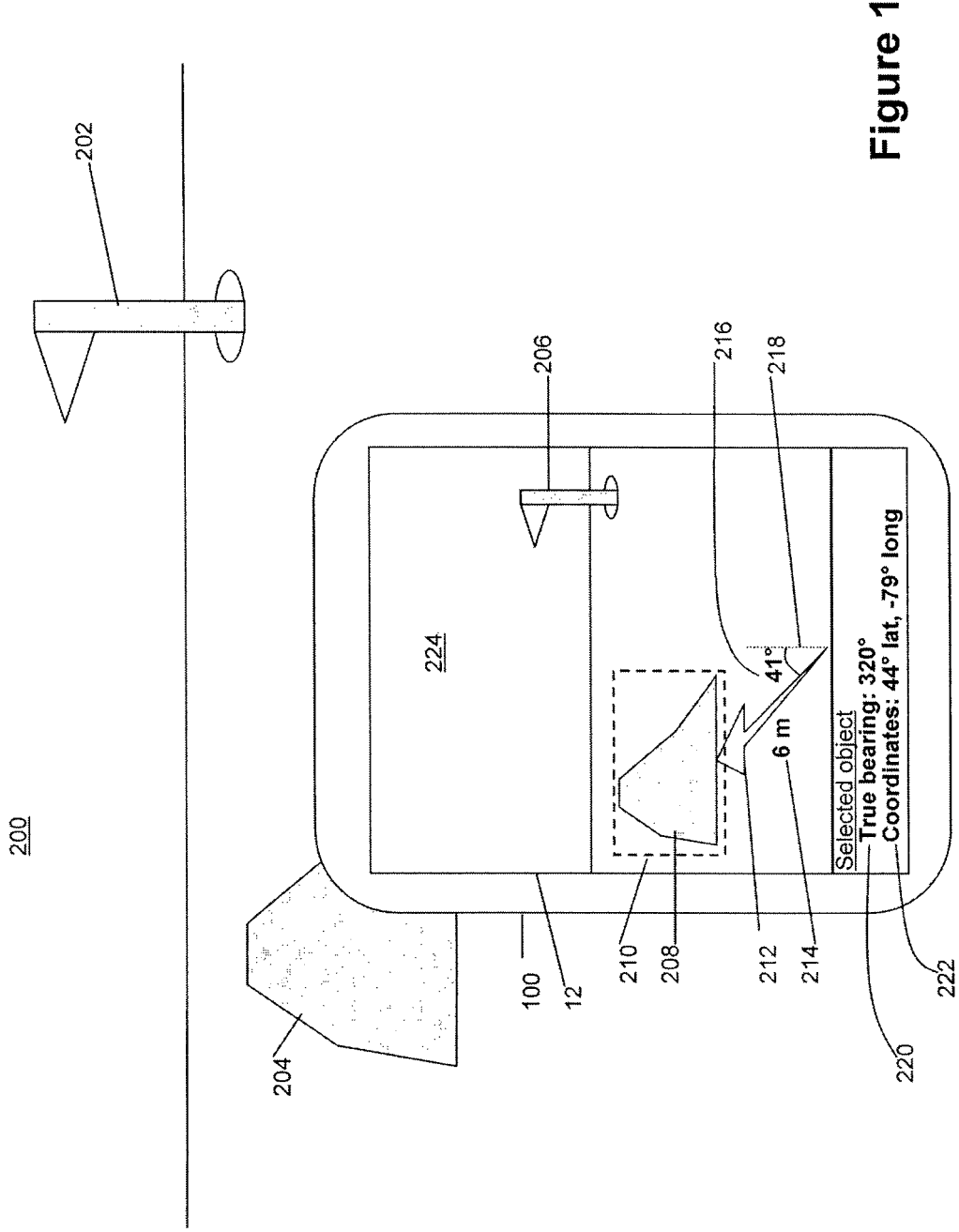
FIG. 1 a schematic diagram of a mobile device viewing a scene, displaying an image of the scene, and augmenting the image with additional information.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In general, a system and a method are provided for displaying location information on a mobile device. The location information can include any one of direction, distance, positional coordinates, etc. The method comprises displaying on the mobile device's display screen an image captured using the mobile device's camera. The mobile device receives a first selection input to select a first object image of a first object shown in the image. The facing direction of the mobile device is detected using the mobile device's facing direction finder, which is communication with a magnetometer. A bearing to the first object relative to the facing direction is determined. A distance between the mobile device and the first object is also determined. Then, displayed, overlaid on the image, is at least a direction indicator of the first object and the distance between the mobile device and the first object, determined from at least the bearing. Overlaying the information on the image augments the image.

Turning to FIG. 1, an example of such an augmented reality display is provided. A mobile device 100 is shown viewing a scene 200. The scene 200 may include a hill 204 and a flag pole 202. Relative to the mobile device 100, the flag pole 202 is positioned further away and to the right side, while the hill 204 is positioned closer to the mobile device 100 towards the left side. The mobile device 100 uses a camera, such as a built-in camera, to view the scene 200 and display an image 223 of the scene 200 on the mobile device's display screen 12. Since the image 224 corresponds with the actual scene 200, the image 224 includes a flag pole image 206 and a hill image 208. In the example, the hill image 208 is selected, as represented by the highlighting box 210. The selection of an object image (e.g. hill image 208) on the display 12 can be made by a user touching the object image, or using a cursor to point to the object image, or by drawing a boundary around the object image. Based on the selection of the hill image 208, the image 224 is augmented with the display of the hill's location information. An arrow 212 points in the direction of the actual hill 204 and the hill image 208 from the mobile device 100 in a first-person perspective. Other location information that is displayed includes the distance 214 from the mobile device 100 to the actual hill 204, the bearing 216 to the actual hill 204 relative to the facing direction 218 of the mobile device, the true bearing 220 (e.g. true north bearing) of the actual hill 204, and the coordinates 222 of the actual hill 204. This location information is displayed in a "layer" on top of the image 224, preferably in correlation to the object images (e.g. hill image 208). As will be discussed later, multiple objects in the image can be selected and their location information can also be displayed.

Preferably, as the mobile device 100 changes orientation or position to view a different scene, the location information of the one or more objects is automatically updated in real-time.

It can therefore be seen that the location information of objects immediately surrounding the mobile device 100, such as objects within view, can be effectively displayed to a user to provide real-time and informative situation awareness. This augments the reality.

Examples of applicable electronic devices include pagers, cellular phones, cellular smart-phones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the principles described herein are also suitable to other devices, e.g. "non-mobile" devices.

In an embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 3:
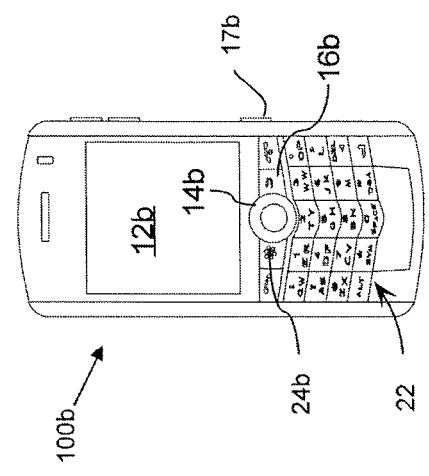
FIG. 3 is a plan view of another example mobile device and a display screen therefor.
Figure 2:
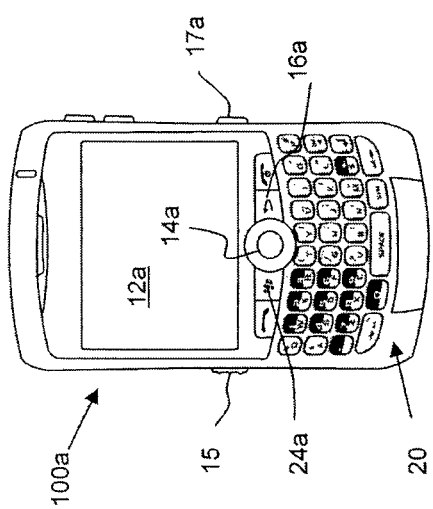
FIG. 2 is a plan view of an example mobile device and a display screen therefor.

Referring to FIGS. 2 and 3, one embodiment of a mobile device 100a is shown in FIG. 2, and another embodiment of a mobile device 100b is shown in FIG. 3. It will be appreciated that the numeral "100" will hereinafter refer to any mobile device 100, including the embodiments 100a and 100b, those embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 2 comprises a display 12a and the cursor or view positioning device 14 shown in this embodiment is a trackball 14a. Cursor or view positioning device 14 may also serve as an input device and is both rotational to provide selection inputs to the main processor 102 (see FIG. 5) and can also be pressed in a direction generally toward housing to provide another selection input to the processor 102. Trackball 14a permits multi-directional positioning of the selection cursor 18 (see FIG. 6) such that the selection cursor 18 can be moved in an upward direction, in a downward direction and, if desired and/or permitted, in any diagonal direction. The trackball 14a is in this example situated on the front face of housing for mobile device 100a as shown in FIG. 2 to enable a user to manoeuvre the trackball 14a while holding the mobile device 100a in one hand. The trackball 14a may also serve as an input device (in addition to a cursor or view positioning device) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 2 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo and video capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 3 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 3, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more cursor or view positioning devices or input devices (such as e.g. a touch pad, a positioning wheel, a joystick button, a mouse, a touchscreen, a set of arrow keys, a tablet, an accelerometer (for sensing orientation and/or movements of the mobile device 100 etc.), or other whether presently known or unknown), may be employed. Similarly, any variation of keyboard 20, 22 may be used. It will also be appreciated that the mobile devices 100 shown in FIGS. 2 and 3 are for illustrative purposes only and various other mobile devices 100 are equally applicable to the following examples. For example, other mobile devices 100 may include the trackball 14b, escape button 16b and menu or option button 24 similar to that shown in FIG. 3 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 4:
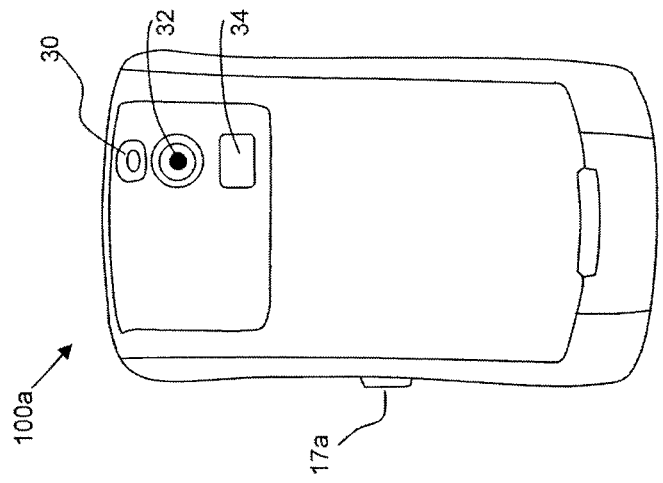
FIG. 4 is a plan view of the back face of the mobile device shown in FIG. 1, and a camera device therefor.

Referring to FIG. 4, in the rear portion of mobile device 100a, for example, there is a light source 30 which may be used to illuminate an object for taking capturing a video image or photo. Also situated on the mobile device's rear face is a camera lens 32 and a reflective surface 34. The camera lens 32 allows the light that represents an image to enter into the camera device. The reflective surface 34 displays an image that is representative of the camera device's view and assists, for example, a user to take a self-portrait photo. The camera device may be activated by pressing a camera button 17, such as the camera button 17a shown in FIG. 7.

To aid the reader in understanding the structure of the mobile device 100, reference will now be made to FIGS. 5 through 7.

Figure 5:
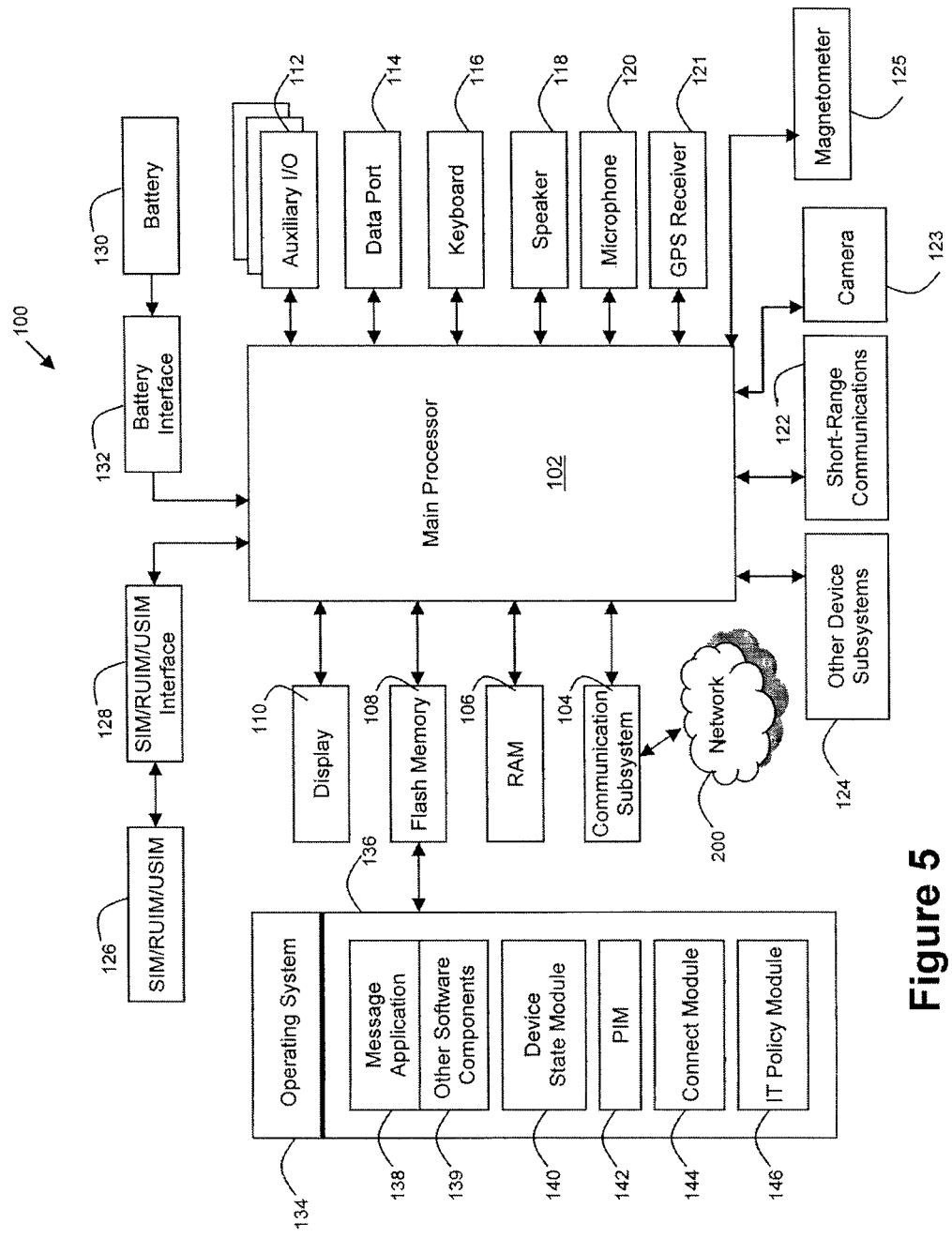
FIG. 5 is a block diagram of an example embodiment of a mobile device.

Referring first to FIG. 5, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a magnetometer 125, and other device subsystems 124. The display 110 can be a touch-screen display able to receive inputs through a user's touch.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 6:
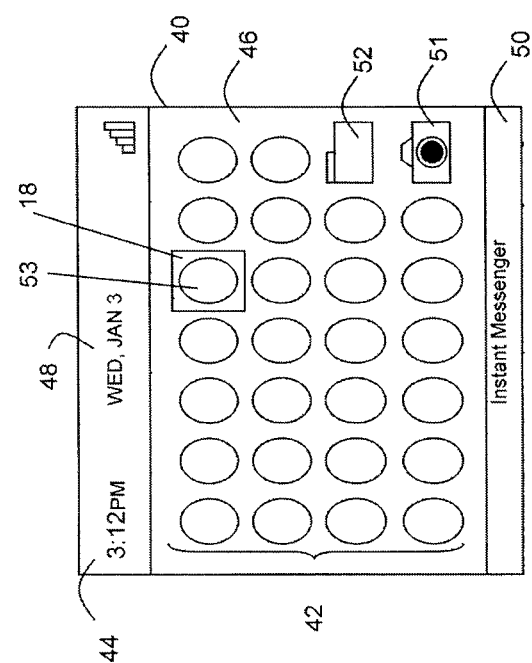
FIG. 6 is a screen shot of a home screen displayed by the mobile device.

Turning now to FIG. 6, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. An example icon may be a camera icon 51 used to indicate an augmented reality camera-based application. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 5, and providing a selection input, e.g. by pressing the trackball 14b.

Figure 7:
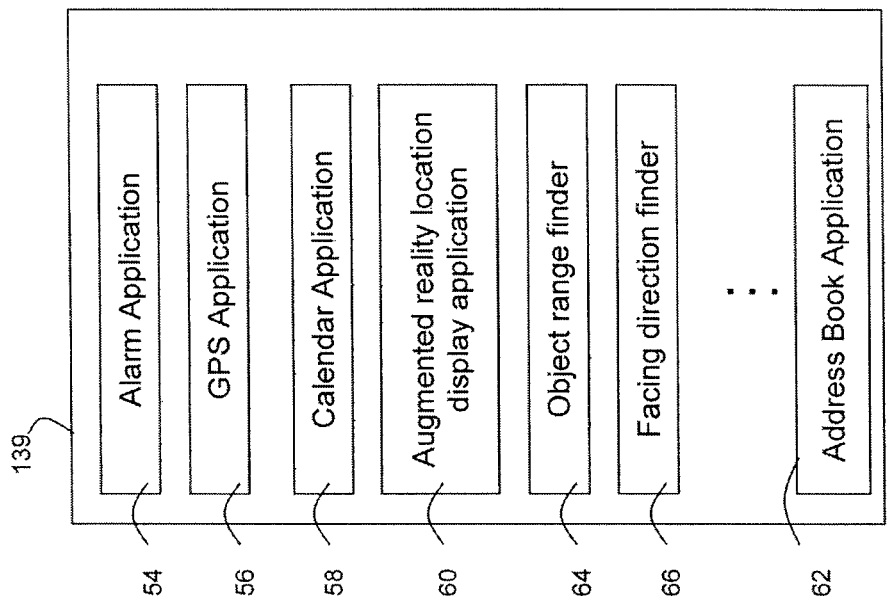
FIG. 7 is a block diagram illustrating example ones of the other software applications and components shown in FIG. 5.

FIG. 7 shows an example of the other software applications and components 139 that may be stored and used on the mobile device 100. Only examples are shown in FIG. 6 and such examples are not to be considered exhaustive. In this example, an alarm application 54 may be used to activate an alarm at a time and date determined by the user. There is also an address book 62 that manages and displays contact information. A GPS application 56 may be used to determine the location of a mobile device 100. A calendar application 58 that may be used to organize appointments. Another example application is an augmented reality location display application 60. This application 60 is able to augment an image by displaying another layer on top of the image, whereby the layer includes location information of objects that are shown in the image.

Other applications include an object range finder 64 and a facing direction finder 66. The object range finder 64 interacts with the camera 123 or another range finding device to determine and output the distance between the mobile device 100 and a certain object that is viewed by the camera 123. The devices and methods of determining the distance between an object and a camera 123 are known and can be used here. Examples of such range finding devices include a camera, infrared optics, and an ultrasonic transmitter and receiver. Different combinations of the range finding devices can also be used, and known methods associated with the devices for finding the distance between an object and a camera 123 are applicable. Although not shown, other range finding devices, in addition to the camera 123, can be part of the mobile device 100.

The facing direction finder 66 provides the direction that the mobile device 100 is facing. The magnetometer 125 is able to measure the magnetic fields to the earth and provide an orientation output to the facing direction finder 66. In this way, the direction finder 66 is able to determine which direction the mobile device 100 is facing.

Figure 8:
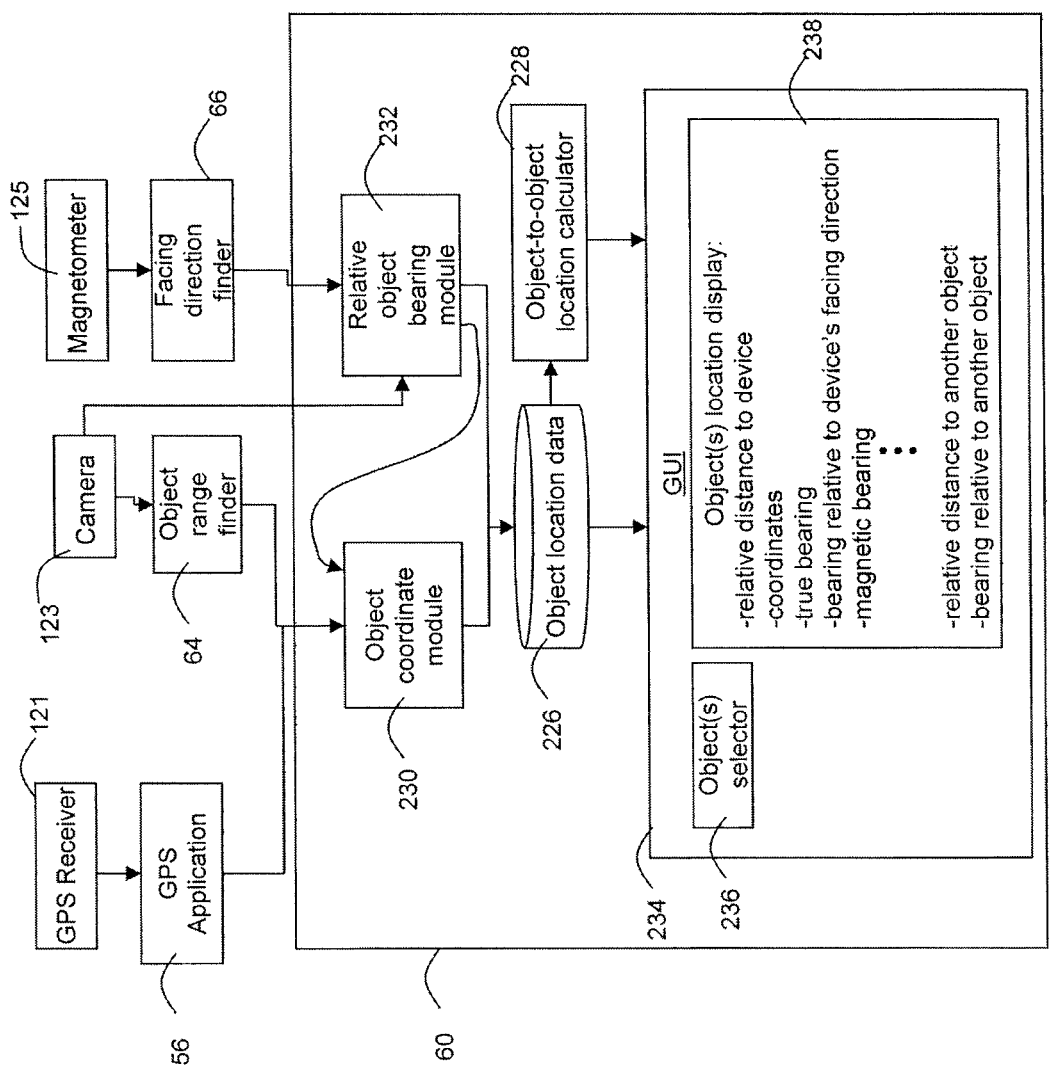
FIG. 8 is a block diagram of an example configuration of an augmented reality location display application.

Turning to FIG. 8, an example configuration of the augmented reality location display application 60 is provided. The augmented reality application 60 receives inputs from the GPS application 56, object range finder 64, and facing direction finder 66. In particular, the GPS application 56 obtains the GPS coordinates of the mobile device 100 from the GPS receiver 121 and passes the coordinates to the augmented reality application 60. The object range finder 64 obtains or calculates the distance between the camera 123 and an object viewed by the camera, and then sends the information to the augmented reality application 60. The facing direction finder 66 communicates with the magnetometer 125 to obtain the facing direction of the mobile device 100 and sends the same to the augmented reality application 60. Other inputs to the augmented reality application 60 include user inputs, such as for selecting objects displayed in the display screen 12.

Continuing with FIG. 8, the augmented reality application 60 includes an object coordinate module 230 for determining the location coordinates of an object, a relative object bearing module 232 for determining the bearing of an object relative to the mobile device's facing direction, an object location data memory 226 for storing location data of different objects, an object-to-object location calculator 228 for determining the angles and distances between two or more objects, and a graphical user interface (GUI) 234 for displaying interactive user controls and information to augment an image.

The object coordinate module 230 obtains the location coordinates of the mobile device 100 from the GPS application 56, the distance between the mobile device 100 and a selected object from the object range finder 64, and the bearing of the object relative to the facing direction of the mobile device 100 as determined by the relative object bearing module 232. Using the coordinates of the mobile device 100 as a first point, and using the distance and bearing as a vector originating from the first point, the object coordinate module 230 is able to calculate the coordinates of the object as a second point. The coordinates of the object are stored in the object location data memory 226.

The relative object bearing module 232 obtains the image data of an object from the camera 123 and the heading or facing direction of the mobile device 100 from the facing direction finder 66, and uses this information to determine the bearing of the object relative to the facing direction of the mobile device 100. As will be discussed later, the correlation between the pixel location and angle of view or field of view of the image is one example method for determining the angle. The relative bearing can be used in combination with heading of the mobile device 100 to determine the true heading of the object, the magnetic heading of the object, etc. This type of direction information can be displayed as a direction indicator. The direction information is also stored in the object location data memory 226. It is also appreciated that an image of the object is stored in the object location data memory 226 in association with the respective location information.

It can be appreciated that multiple objects can be selected, either one at a time or simultaneously, and their associated information can be stored in the object location data memory 226. This location data can be used by the object-to-object location calculator 228 to determine the distances and angles between objects. The object-to-object location calculator 228 applies known trigonometric and geometry equations to determine the distances and angles.

The GUI 234 displays the location information of one or more objects in a laid-over manner to augment the image displaying the one or more objects. The object or objects location display module 238 shows, for example, one or more of the following: the relative distance from the object to the mobile device 100; coordinates of the object; true (North) bearing of the object; bearing relative to the mobile device's facing direction; the object's magnetic bearing; the distance between two or more objects; and the angle or bearing from one object to another. Other types of location information can also be displayed. Preferably, although not necessarily, the location information is displayed in a way to augment the image, for example, by positioning the information over or on-top of the image.

The GUI 234 also includes an object or objects selector 236 for receiving user inputs to select objects shown in an image. As described earlier, the user can select an object in an image by using a pointer or cursor to directly select or highlight the object. Different image processing techniques and patter recognition algorithms can be used to identify an object's boundary shape. Upon detecting the selected image, a highlighting circle, rectangle, or other polygon, can be drawn around the image to identify which image has been selected. If the mobile device 100 changes orientation or position, the object selector 236 maintains the highlight around the selected object using pattern recognition and image processing. The selected image can also be automatically selected again if its location information has been stored in the object location data memory 226. In other words, if it is known the camera 123 is looking at a known location of an object, and the pattern (e.g. shape, size, color, etc.) of the object is detected in the location, then the object is automatically selected.

Although not shown, the object location data memory 226 can be populated with location information of known objects, such as landmarks, buildings, etc. Using the approach described above, the object selector 236 is able to identify these known objects if they are in view of the camera 123 and can automatically select the known objects. The images of the known objects can then be augmented with the location information, such as for example, relative bearings and directions.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 9:
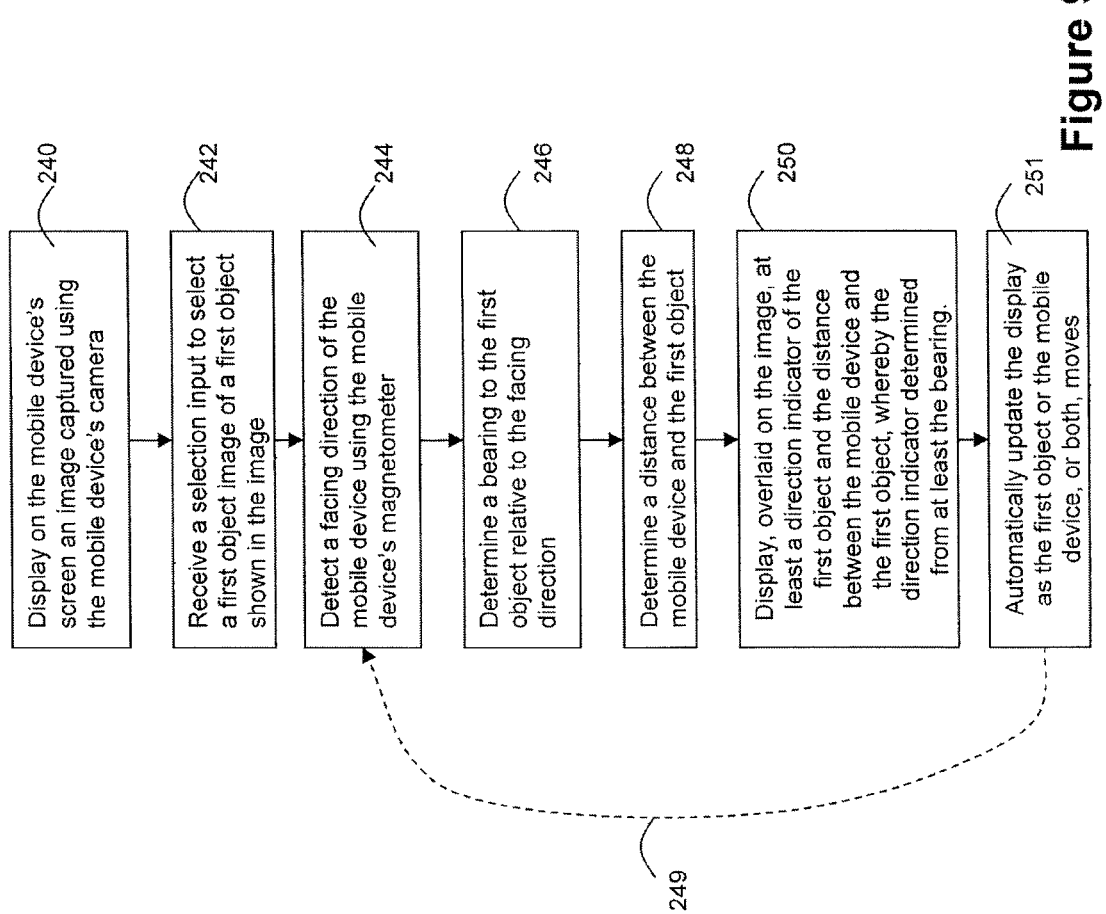
FIG. 9 is a flow diagram of example computer executable instructions for determining and displaying a direction to an object shown in an image on a display of a mobile device, and the distance to the object.

Turning to FIG. 9, example computer executable instructions are provided for displaying location information about an object shown through a display on a mobile device 100. At block 240, the image viewed or captured by the camera 123 is displayed on the mobile device's display screen 12. Then, a selection input is received, either automatically or from a user, to identify a first object in the image (block 242). At block 244, the facing direction or heading of the mobile device 100 is detected using the magnetometer 125. At block 246, a bearing (e.g. angle or direction) to the first objects relative to the facing direction of the mobile device 100 is determined. At block 248, the distance between the mobile device 100 and the first object is determined. At block 250, a direction indicator of the first object, and the distance between the mobile device 100 and the first object are displayed on top or overlaid on the image. At block 251, the display of the location information is automatically updated if it is detected that the first object or the mobile device, or both, move. As shown by the dotted line 249, blocks 244, 246, 248 and 250 are repeated to update and display the most current location information of the object. It can be appreciated that by updating the location information frequently, real-time situational awareness can be provided through the augmented reality application 60.

Figure 10:
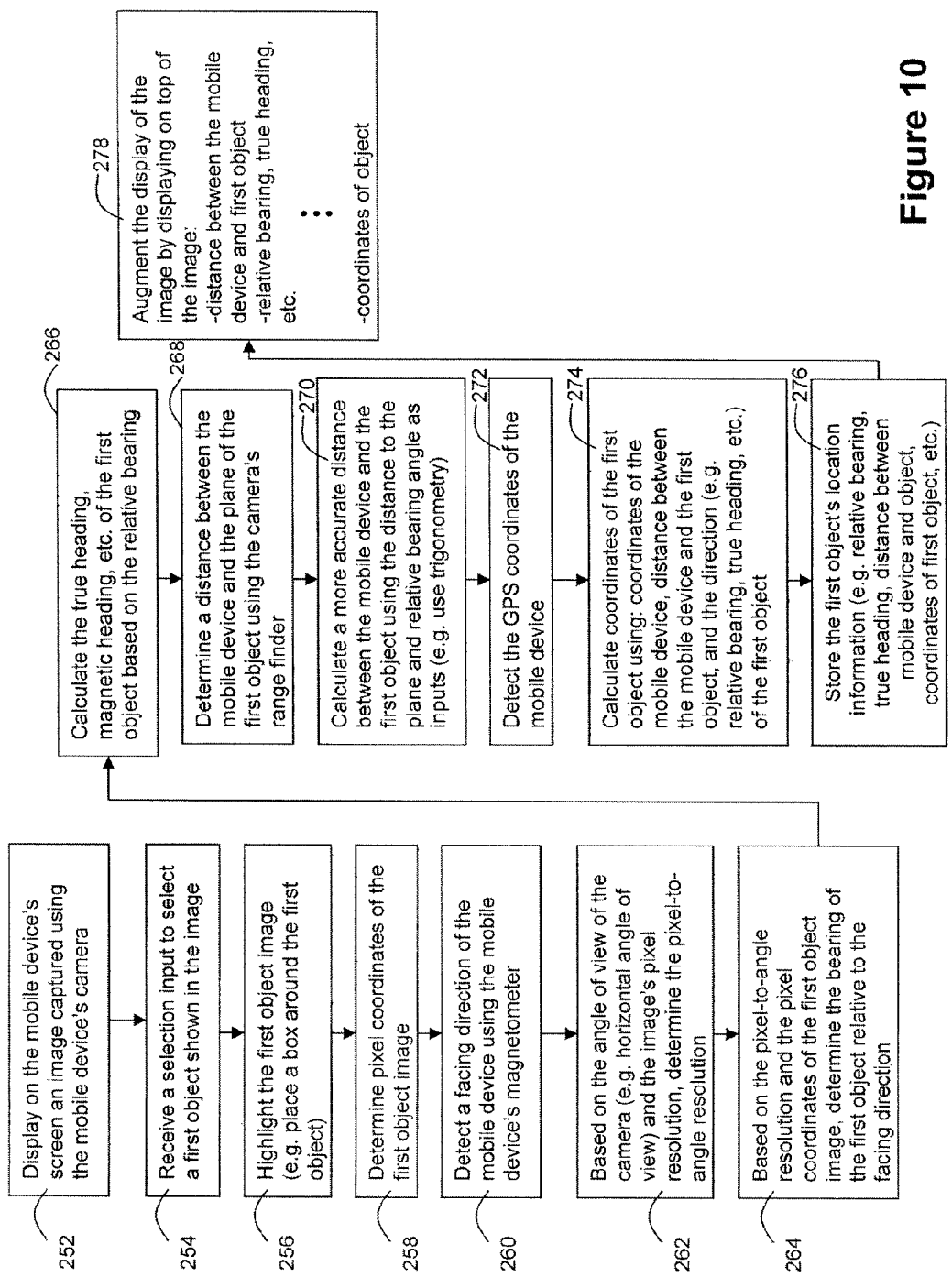
FIG. 10 is a flow diagram of further example computer executable instructions for determining and displaying a direction to an object shown in an image on a display of a mobile device, the distance to the object, and location of the object.

Turning to FIG. 10, further example computer executable instructions are provided for displaying location information. Example methods for implementing certain operations are provided. At block 252, an image captured by the camera 123 is displayed on the mobile device 100. A selection input is then received to select a first object shown in the image 254. Selection of the first object is done by selecting the first object image included in the image captured by camera 123. At block 256, upon selecting the first object (through selecting the first object image), the first object image is highlighted, for example by placing a box around the first object image. Other highlighting or identification methods are equally applicable. At block 258, pixel coordinates of the first object image are determined from the image. By way of background, an electronic image typically comprises a two-dimensional grid of pixels in the horizontal (X) and vertical (Y) directions, and an X and Y pixel coordinate can mark the location of an object shown in the image. At block 260, the facing direction of the mobile device is obtained from the magnetometer 125. At block 262, based on the angle of view (AOV) of the camera and the image's pixel resolution, the pixel-to-angle resolution is determined. The pixel-to-angle resolution describes the relationship between the amount of AOV represented in a pixel. This can be determined by dividing the pixel resolution with the AOV.

By way of background, the AOV refers to the angular extent of a given scene that is imaged by a camera, and is sometimes also referred to as field of view. The AOV can be measured as the horizontal, vertical or diagonal AOV. Typically, the horizontal AOV is used since it is typically desired to measure the horizontal angular direction of an object. However, the vertical AOV can also be used to measure the vertical or elevation angles of an object relative to the mobile device 100 using the principles described herein.

Continuing with FIG. 10, at block 264, based on the pixel-to-angle resolution and the pixel coordinates of the first object image, the bearing of the first object relative to the facing direction of the mobile device 100 is determined.

Figure 11:
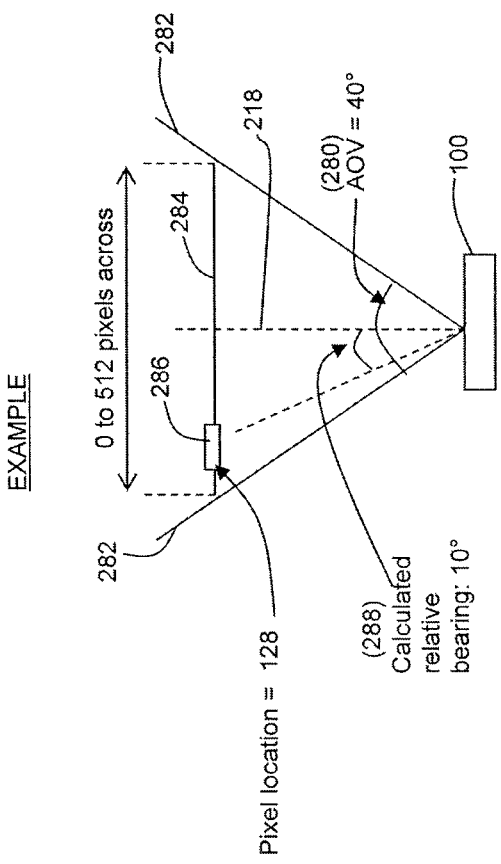
FIG. 11 is a schematic diagram illustrating an example for calculating the relative bearing between an object and the facing direction of the mobile device.

Turning briefly to FIG. 11, the process of determining the pixel-to-angle resolution and calculating the relative bearing is further explained through an example. A plan view of a mobile device 100 capturing an image 284 is provided. The camera 123 on the mobile device 100 has an AOV of 40° (280) as emphasized the AOV boundary lines 282; this is typically a known parameter. Another known parameter is the image resolution. The image 284 has a horizontal resolution of 512 pixels, whereby the pixels are numbered consecutively from the first to the $512^{th}$ pixel. Therefore, the pixel-to-angle resolution, or vice versa, is [512 pixels/40°=]12.8 pixels/degree. The horizontal center line 218 of the image 284 is located at about the $256^{th}$ pixel. The horizontal coordinate of the object 286 in the image 284 is the $128^{th}$ pixel. Therefore, the bearing of the object 286 relative to the facing direction or center line 218 of the mobile device 100 is [($256^{th}$ pixel–$128^{th}$ pixel)/(12.8 pixels/degree)=]10°. In this way, the pixel location of the object 286 is correlated with the pixel-to-angle relationship, thereby resulting in the bearing angle. The same approach can be used to determine the elevation angle of an object relative to the horizontal plane defined by the mobile device 100, whereby the vertical pixel-to-angle resolution is calculated using the vertical AOV and the vertical image resolution, and the elevation is determined using the vertical pixel coordinate of the object image.

Turning back to FIG. 10, at block 266, the true heading, the magnetic heading, etc. of the first object is calculated using the relative bearing of the first object. For example, if it is known that the true bearing of the facing direction of the mobile device is 1° clockwise from North and the relative bearing of the object is 41° counter-clockwise from the facing direction, then the true bearing of the object is 320° clockwise from North.

At block 268, a distance between the mobile device 100 and the plane defined by the first object is determined using the camera's range finder. In this example, the plane can be determined using known imaging techniques. The distance to the plane however, may not accurately represent the distance to the object, if the object is offset from the image's center. Therefore, at block 270, a more accurate distance between the mobile device 100 and the first object is determined using the distance to the plane and the relative bearing angle as inputs. Trigonometric equations can be used to calculate the distance, taking into account for the angular offset.

Figure 12:
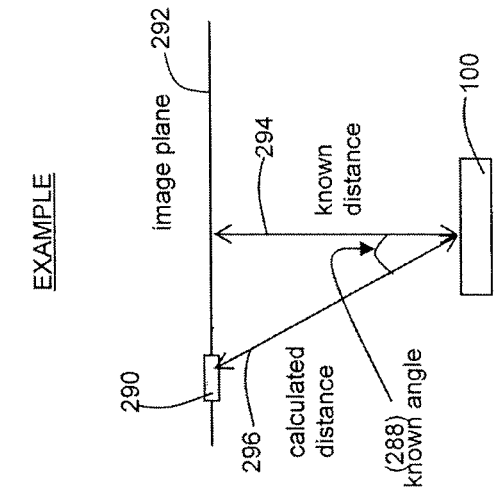
FIG. 12 is a schematic diagram illustrating an example for calculating a distance between the mobile device and the object.

Turning briefly to FIG. 12, an example explains the operation of block 268. A plan view of a mobile device 100 is shown relative to an object 290. A plane 292 that is parallel to the mobile device 100 and positioned at a distance defined by the object 290 is identified. The distance 294 between the plane 292 and the mobile device 100 is provided through known techniques. As per the earlier operations, the bearing angle 288 of the object is also known. Therefore, the distance 296 can be calculated using trigonometric functions. It can be appreciated that this is a non-limiting example and other methods for determining the distance of an object, including the use of various range finding devices, can be used.

Turning back to FIG. 10, at block 272, the GPS coordinates of the mobile device 100 are obtained or detected. At block 274, the coordinates of the first object are calculated using the coordinates of the mobile device, the distance between the mobile device and the first object, and the direction (e.g. relative bearing, true heading, etc.) of the first object. At block 276, the first object location information (e.g. relative bearing, true heading or bearing, distance to the first object, coordinates, etc.) is stored in the object location data memory 226. An image of the object may also be stored in association with the location information. At block 278, the display of the image is augmented using the location information of the first object. In particular, one or more types of location information is stored on top of the image as a secondary layer.

The displayed information can be updated as the first object or the mobile device 100, or both, move.

Figure 13:
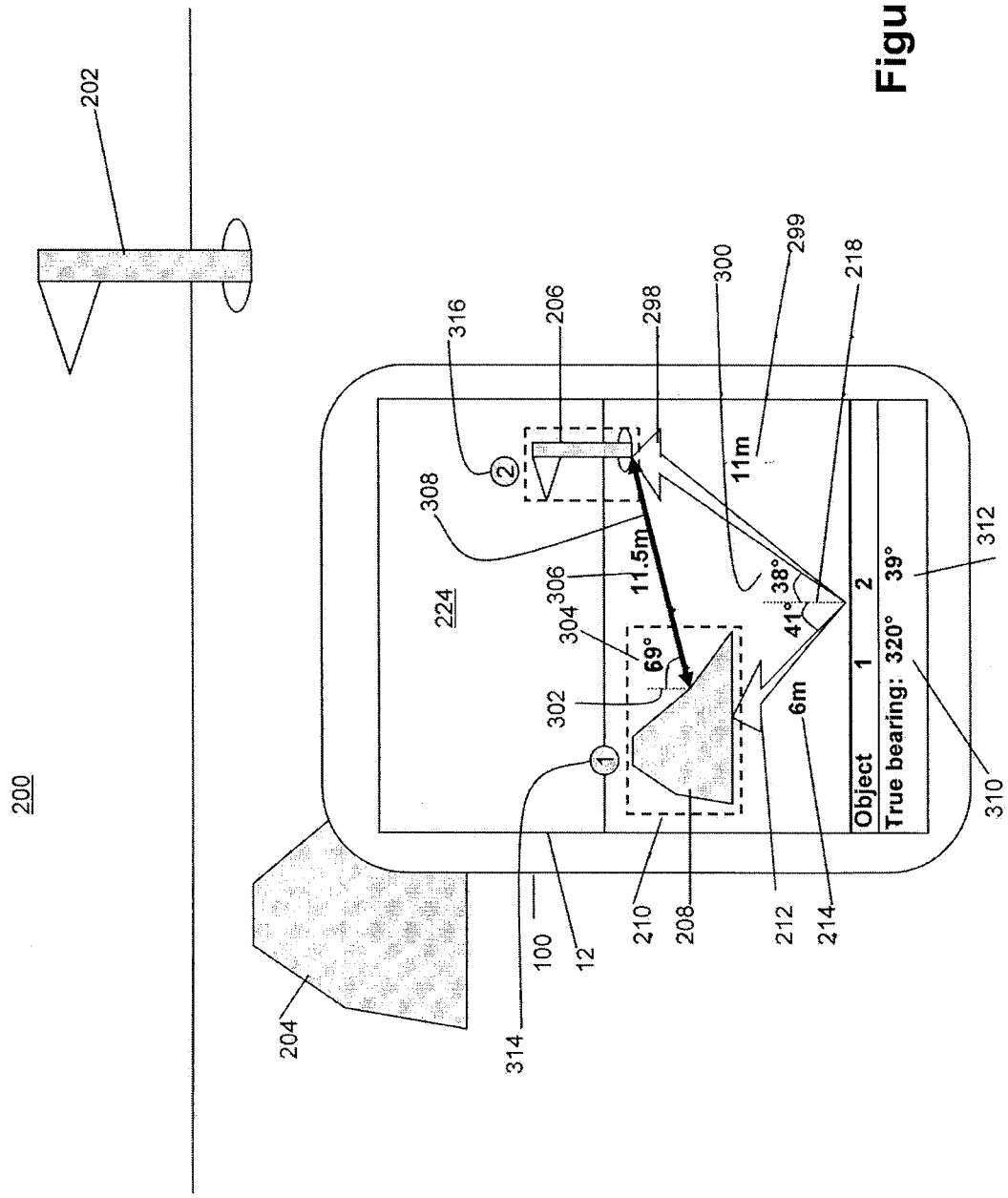
FIG. 13 is a schematic diagram illustrating the augmentation of an image displayed on the mobile device, whereby two or more objects shown in the image are selected and information regarding the objects are simultaneously displayed.

As described earlier, the location information of two or more objects can also be displayed in an image to augment reality. An example is shown in FIG. 13. The mobile device 100 captures an image 224 of the scene 200, which includes both the hill 204 and flag pole 202. The image 224 shows that both the hill image 208 and flag pole image 206 are highlighted. The location information of the hill 204 is displayed in an augmented reality layer. Markers 314 and 316 indicate that the hill 204 and the flag pole 202 are a first and a second object, respectively. The location information of the flag pole 202 is simultaneously displayed with the location information of the hill image 208. This location information for the second object is determined in the same way as the first object, using the principles described above. In particular, a distance indicator 299 shows the distance between the flag pole 202 and the mobile device 100. The direction 300, in this case the bearing between the flag pole 206 to the mobile device's facing direction, is also displayed. An arrow 298 is shown in the display 12, from the mobile device's perspective to the flag pole 206, emphasizing the vector from the mobile device 100 to the flag pole 202. Other information displayed includes the true bearings 310, 312 of the hill 204 and the flag pole 202, respectively.

Based on the location information of the hill 204 and the flag pole 202, the distance 306 and angle 304 between the two objects can be computed and displayed. This information can be computed using trigonometric calculations. An arrow 308 emphasizes the vector between the hill 204 and the flag pole 202. In this case, the angle is determined relative the reference line 302 originating from the hill image 208, whereby the reference line is parallel to the facing direction line 218 of the mobile device 100. It can be appreciated that other GUI configurations are applicable, and that similar principles can be used to augment an image using location data for two or more selected objects.

Turning to FIG. 14, example computer executable instructions are provided for displaying location data for two or more objects. At block 322, the mobile device 100 displays an image viewed from a camera 123. A selection input is received to identify a first object (block 324) and the location information (e.g. direction, distance, coordinates, etc.) of the first object is determined (block 326). The location information of the first object is saved for later use. At block 328, another or a second selection input is received to identify a second object in the image. The location information of the second object is determined (block 330) using similar principles described above with respect to the first object. In particular, the facing direction of the mobile device 100 is determined (block 336), the bearing of the second object relative to the facing direction is determined (block 338), and the distance between the mobile device 100 and the second object is determined (block 340). This information about the second object is saved. At block 332, the angle and distance between the first object and the second object is determined by using the location information of the two objects. This is determined using known trigonometric functions. At block 334, the image is then augmented with the location information of the two objects. In particular, the one or more of the following information is displayed, overlaid the image: the direction of one of both of the objects; the distance to one or both of the objects; the coordinates of one or both of the objects; the distance between the first object and the second object; and the angle between the first object and the second object. The process is repeated and the location information is updated when it is detected that there are changes in location or orientation of one or more of the objects, or the mobile device 100.

Although the above examples describe displaying location information for two or more objects in an image, the same principles can be used when a first object is in one image and a second object is in another, e.g. second image. For example, turning to FIGS. 15 and 16, a first portion of a scene 200a and second portion of a scene 200b is shown, respectively. In FIG. 15, the mobile device 100 captures only the hill 204 within its field of view, since the flag pole 202 is located relatively far away. Line 344 indicates the distance and direction of the second object, e.g. the flag pole 202, relative to the first object, e.g. the hill 204, even though the image of the flag pole is not shown in the display 12 of FIG. 15. An "out-of-screen" indicator 342, notifies that second object is located in a certain direction off-screen, and that by rotating or moving the mobile device a certain way (e.g. to the right), the second object can be seen. FIG. 16, similarly only shows the flag pole image 206 (not the hill image 208) and a line 346 indicating the vector to the hill 204. An "out-of-screen" indicator 348 is notifies that the first object is located off the screen in a certain direction (e.g. to the left). Therefore, it can be seen that the location information of the different objects can be used to augment an image and the awareness of other objects, even when the first object is in a first image frame and the second image is in a second image frame.

The above systems and methods can be applied to, for example, landscaping, accident reporting, architecture, mapping, and surveying.

The schematics and block diagrams used herein are just for example. Different configurations and names of components can be used. For instance, components and modules can be added, deleted, modified, or arranged with differing connections without departing from the spirit of the invention or inventions.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A method of displaying location information on a mobile device, comprising:
    displaying on the mobile device's display an image captured using the mobile device's camera;
    receiving a first input to select a first object image of a first object shown in the image;
    detecting a facing direction of the mobile device using the mobile device's facing direction finder;
    determining a bearing to the first object relative to the facing direction; and
    displaying, overlaid on the image, at least a direction indicator of the first object, determined from at least the bearing.

2. The method of claim 1 further comprising displaying, overlaid on the image, a distance between the mobile device and the first object.

3. The method of claim 1 wherein the bearing is determined by obtaining a relationship between an angle of view of the camera and a pixel resolution of the image, and correlating a pixel location of the first object image with the relationship.

4. The method of claim 1 wherein the direction indicator is at least one of: a true bearing relative to true North; the bearing relative the facing direction; and the magnetic bearing.

5. The method of claim 1 wherein the first object image is highlighted on the display upon receiving the first input.

6. The method of claim 2 further comprising:
    detecting a coordinate location of the mobile device; and
    determining a coordinate location of the first object based on the coordinate location of the mobile device, the distance between the mobile device and the first object, and the direction of the bearing.

7. The method of claim 1 further comprising determining an elevation angle of the object relative to the mobile device by obtaining a relationship between a vertical angle of view of the camera and a pixel resolution of the image, and correlating a pixel location of the first object image with the relationship.

8. The method of claim 1 further comprising:
    receiving a second input to select a second object image of a second object shown in the image;
    determining a second bearing to the second object relative to the facing direction; and
    displaying, overlaid on the image, at least a second direction indicator of the second object, determined from at least the second bearing.

9. The method of claim 8 further comprising displaying, overlaid on the image, a distance between the mobile device and the second object.

10. The method of claim 8 further comprising:
    determining an angle and a distance between the first object and the second object; and
    displaying the angle and the distance between the first object and the second object overlaid the image.

11. The method of claim 8 wherein, upon detecting at least one of the first object, the second object and the mobile device has changed orientation or position, updating the display of at least one of the direction indicator and the second direction indicator.

12. The method of claim 11 further comprising, upon detecting that one of the first object or the second object is no longer within the image, displaying an off-screen indicator notifying that the one of the first object or the second object can be viewed by moving or rotating the camera in a certain direction.

13. A computer readable medium for displaying location information on a mobile device, comprising instructions for:
    displaying on the mobile device's display an image captured using the mobile device's camera;
    receiving a first input to select a first object image of a first object shown in the image;
    detecting a facing direction of the mobile device using the mobile device's facing direction finder;
    determining a bearing to the first object relative to the facing direction; and
    displaying, overlaid on the image, at least a direction indicator of the first object, determined from at least the bearing.

14. A mobile device comprising a processor coupled to a camera, a display and memory, the memory storing computer executable instructions for:
- displaying on the mobile device's display an image captured using the mobile device's camera;
- receiving a first input to select a first object image of a first object shown in the image;
- detecting a facing direction of the mobile device using the mobile device's facing direction finder;
- determining a bearing to the first object relative to the facing direction; and
- displaying, overlaid on the image, at least a direction indicator of the first object, determined from at least the bearing.

15. The mobile device of claim 14 wherein the memory further comprises computer executable instructions for displaying, overlaid on the image, a distance between the mobile device and the first object.

16. The mobile device of claim 14 wherein the bearing is determined by obtaining a relationship between an angle of view of the camera and a pixel resolution of the image, and correlating a pixel location of the first object image with the relationship.

17. The mobile device of claim 14 wherein the direction indicator is at least one of: a true bearing relative to true North; the bearing relative the facing direction; and the magnetic bearing.

18. The mobile device of claim 14 wherein the first object image is highlighted on the display upon receiving the first input.

19. The mobile device of claim 15 wherein the memory further stores computer executable instructions for:
- detecting a coordinate location of the mobile device; and
- determining a coordinate location of the first object based on the coordinate location of the mobile device, the distance between the mobile device and the first object, and the direction of the bearing.

20. The mobile device of claim 14 further comprising a magnetometer to detect the facing direction of the mobile device.

* * * * *